US010835829B2

(12) United States Patent
Robbins et al.

(10) Patent No.: US 10,835,829 B2
(45) Date of Patent: Nov. 17, 2020

(54) METHOD FOR IDENTIFYING AND DESCRIBING GROUP, COORDINATING DEVICE, AND COMPUTER PROGRAM PRODUCT

(71) Applicant: HTC Corporation, Taoyuan (TW)

(72) Inventors: Daniel Chaim Robbins, Taoyuan (TW); Brent DelFierro Dietrich, Taoyuan (TW); Ayfer Gokalp, Taoyuan (TW); Jacqueline Pospisil, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/233,061

(22) Filed: Dec. 26, 2018

(65) Prior Publication Data
US 2020/0206637 A1    Jul. 2, 2020

(51) Int. Cl.
*A63F 13/00* (2014.01)
*A63F 13/795* (2014.01)
*G06F 16/903* (2019.01)
*A63F 13/35* (2014.01)
*A63F 13/56* (2014.01)

(52) U.S. Cl.
CPC ............ *A63F 13/795* (2014.09); *A63F 13/35* (2014.09); *A63F 13/56* (2014.09); *G06F 16/903* (2019.01)

(58) Field of Classification Search
CPC ........ A63F 13/79; A63F 13/847; A63F 13/85; A63F 2300/5546; A63F 2300/57; A63F 2300/6018; A63F 2300/8082
See application file for complete search history.

(56) References Cited

U.S. PATENT DOCUMENTS

| 8,510,137 | B2 | 8/2013 | Bonev et al. |
| 9,324,078 | B2 | 4/2016 | Palahnuk |
| 2016/0358283 | A1* | 12/2016 | Regala ................. A63F 13/30 |

FOREIGN PATENT DOCUMENTS

| CN | 102076387 | 4/2014 |
| TW | 200919210 | 5/2009 |

* cited by examiner

*Primary Examiner* — Lawrence S Galka
(74) *Attorney, Agent, or Firm* — JCIPRNET

(57) ABSTRACT

The disclosure provides a method for identifying and describing a group, a coordinating device, and a computer program product. The method includes: accumulating a staying time of a plurality of avatars staying at a certain location, wherein the avatars are controlled by a plurality of users; identifying the avatars as a specific ad-hoc group and monitoring a plurality of interactive behaviors between the avatars if the staying time exceeds a time threshold; providing at least one of the users with a questionnaire based on the interactive behaviors; generating a group description about the specific group formed by the avatars based on a plurality of answers of the at least one of the users on answering the questionnaire; and communicating this description to other users.

30 Claims, 3 Drawing Sheets

METHOD FOR IDENTIFYING AND DESCRIBING GROUP, COORDINATING DEVICE, AND COMPUTER PROGRAM PRODUCT

BACKGROUND OF THE INVENTION

1. Field of the Invention

The present invention generally relates to a method for identifying and describing a group of users, a coordinating device, and a computer program product, in particular, to a method for identifying and describing a group of users, a coordinating device, and a computer program product based on the answers of the provided questionnaire.

2. Description of Related Art

In current social virtual reality (VR) systems, inexperienced users or new arrivals to a social locale may have a difficult time determining what existing groupings of users are engaged in. For the purposes of this document, a grouping of users is meant to include people engaged in coordinated online activities. Users both in and outside of these groups may be represented by synthetic avatars or via transmitted video of each person. These groups may be pre-existing and formalized and already self-identified or they may be ad-hoc and exist only for a short amount of time. Some of the activities these groups engage in may be off-putting to users outside of these groups, who encounter the groups for the first time. For example, existing groups may be sharing in-jokes, passing shared memes, using avatars that offensive, or presenting threatening behaviors that are part of a previously agreed upon social compact within the group. When unaccustomed users come across or try to join in with the existing groups they may be subject to harassing words and actions. For example, other participants may inappropriately invade their physical space, virtually grope their synthetic avatar, and issue sexist, racist, and bigoted utterances. The typical reaction within current online communities, including social VR systems, is reporting offenders, muting them, or leaving the locale. While serving to quell the offensive behavior, these existing measures also work against creating a sense of harmony and safe interaction. The collisions between inexperienced users and implicit groups can reinforce negative behaviors and hamper the adoption of social VR. Current systems do allow verbal communication but by that point the offense may have already occurred.

In current synchronous social VR systems (experiences where multiple people can interact in real-time via 3D avatars) there aren't ways for groups of people to easily communicate their intent and aims to other participants. It's easy for users who are new to a virtual locale to make missteps in how they communicate with people already in the space. This leads to misunderstandings, feelings of exclusion, and missed opportunities for collective action.

A newly arrived individual can ask existing participants as to their activity but the act of asking (in itself) from an outsider can result in a rebuff or mockery. This can create a cycle of social distancing. The new user may give up on the experience or report prevailing participants for rude behavior even though the existing group was operating in an internally acceptable manner.

Therefore, for people with ordinary skills in the art, it is preferable to create a safe way to inquire and communicate community and group aims, standards, and activities to users who are outside of the group.

SUMMARY OF THE INVENTION

Accordingly, the present disclosure is directed to a method for identifying and describing a group of users, a coordinating device, and a computer program product that can be used to solve the technical and social problem mentioned in the above.

The disclosure provides a method for identifying and describing a group of users, comprising: accumulating a staying time of a plurality of avatars or other representations staying at a certain location, wherein the avatars or projected video user representations are controlled by a plurality of users; identifying the avatars as a specific group and monitoring a plurality of interactive behaviors between the avatars if the staying time exceeds a time threshold; providing at least one of the users within the group with a questionnaire based on the interactive behaviors; generating a group description about the specific group formed by the avatars based on a plurality of answers of the at least one of the users on answering the questionnaire, and presenting that self-identified description to other users who are in digital proximity to the group.

The disclosure provides a coordinating device including a non-transitory storage circuit and a processor. The non-transitory storage circuit stores a plurality of modules. The processor is coupled with the non-transitory storage circuit and executes the modules to perform following steps: accumulating a staying time of a plurality of avatars or video representations of users, staying at a certain location, wherein the avatars are controlled by a plurality of users; identifying the avatars as a specific group and monitoring a plurality of interactive behaviors between the avatars if the staying time exceeds a time threshold; providing at least one of the users with a questionnaire based on the interactive behaviors; generating a group description about the specific group formed by the avatars based on a plurality of answers of the at least one of the users on answering the questionnaire, and then presenting this identifying information to other users who may encounter the group in an online space.

The disclosure proposes a computer program product for use in conjunction with a coordinating device. The computer program product includes a computer readable storage medium and an executable computer program mechanism embedded therein, the executable computer program mechanism comprising instructions for: accumulating a staying time of a plurality of avatars staying at a certain location, wherein the avatars are controlled by a plurality of users; identifying the avatars as a specific group and monitoring a plurality of interactive behaviors between the avatars if the staying time exceeds a time threshold; providing at least one of the users with a questionnaire based on the interactive behaviors; and generating a group description about the specific group formed by the avatars based on a plurality of answers of the at least one of the users on answering the questionnaire.

Based on the above, the method for identifying and describing a group, the coordinating device, and the computer program product of the disclosure may identify a plurality of avatars as a specific group after the avatars are detected to be staying together for a while and generate associated group descriptions based on the interactive behaviors therebetween.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. The invention is not limited to the visual presentations included within these figures and may extend to other user representations such as 2D or 3D video transmission of user activities.

DESCRIPTION OF THE EMBODIMENTS

Figure 1:
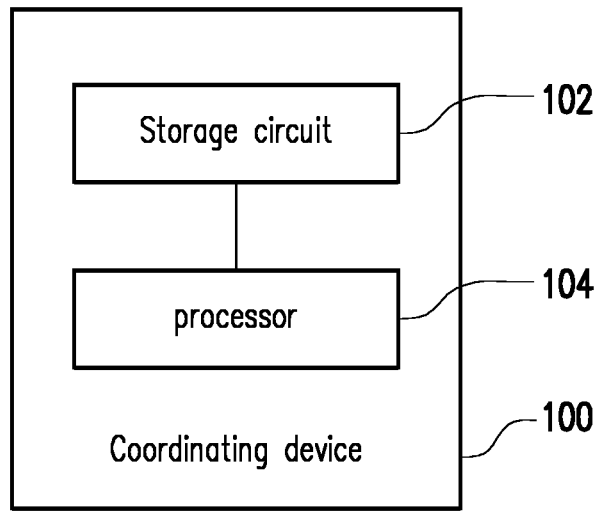
FIG. 1 is a functional block diagram illustrating a coordinating device according to one embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a functional block diagram illustrating a coordinating device according to one embodiment of the disclosure. In FIG. 1, a coordinating device 100 may include a storage circuit 102 and a processor 104. The storage circuit 102 may be one or a combination of a stationary or mobile random access memory (RAM), read-only memory (ROM), flash memory, hard disk, or any other similar device, and which records a plurality of programs or modules that can be executed by the processor 104.

The processor 104 may be coupled to the storage circuit 102. In various embodiments, the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, an ARM-based processor, and the like.

The processor 104 may access the programs stored in the storage circuit 102 to perform the method for identifying and describing a group of the present disclosure, and the detailed discussions will be provided hereinafter.

Figure 2:
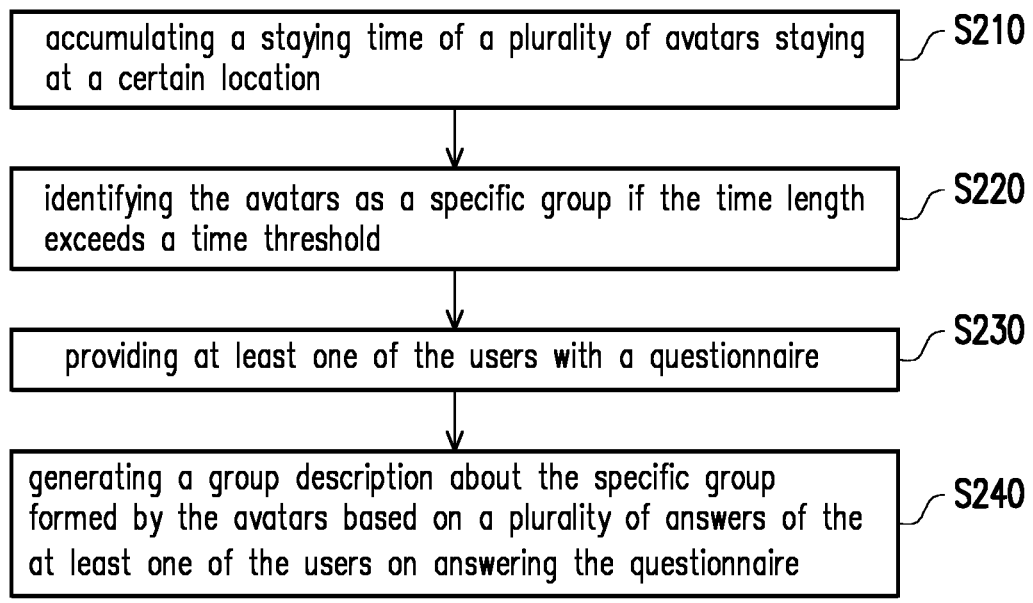
FIG. 2 is a flow chart of the method for identifying and describing a group of one embodiment of the disclosure.

See FIG. 2 and FIG. 3A to FIG. 3E, wherein FIG. 2 is a flow chart of the method for identifying and describing a group of one embodiment of the disclosure, and FIG. 3A to FIG. 3E are exemplary application scenarios illustrated based on FIG. 2. The method of FIG. 2 could be performed by the coordinating device 100 of FIG. 1, and the details of the steps of FIG. 2 will be discussed in accompanying with the elements of FIG. 1 and the scenarios illustrated in FIG. 3A to FIG. 3E.

In step S210, the processor 104 accumulates a staying time of a plurality of avatars 311a, 311b, 311c and 311d staying at a certain location 305. In the present embodiment, the avatars 311a-311d may be virtual characters that can be controlled by users (e.g., players) in virtual environments such as VR environments, online game environments. In other embodiments, the avatars may be 3D avatars and/or other user representative in newer technology such as holographic video, or the like, but the disclosure is not limited thereto. For example, the avatars 311a-311d may perform designated moving patterns or postural expressions in response to the users' gestures, postures, texting, and/or provide voice expressions based on the voices of the users for other users to hear. That is, the users of the avatars 311a-311d may communicate/interact with each other by using the postural expressions, texting, and/or voice expressions of the avatars 311a-311d.

In the present embodiment, the coordinating device 100 may be assumed to be the device (e.g., a smart phone, a tablet, a personal computer) used by one of the users to control one of the avatars 311a-311d. For ease of the following discussions, the user possessing the coordinating device 100 may be called as a host user, and the avatar controlled by the host user may be called as a host avatar, e.g., the avatar 311a.

The following embodiments will be discussed based on assuming the avatar 311a as the host avatar, but the disclosure is not limited thereto. Under this situation, the processor 104 may firstly define a certain space around the avatar 311a (i.e., the host avatar) as the certain location 305. For example, the certain space may be a virtual sphere with a specific radius while regarding the avatar 311a (i.e., the host avatar) as the center thereof. For other example, the certain space may be a virtual building or room where the avatar 311a (i.e., the host avatar) currently locates in the VR environments or the online game environments. In other examples, the certain space of the avatar 311a (i.e., the host avatar) may be designed as any aspects based on the requirements of the designer. In some other embodiments, the certain space of the avatar 311a (i.e., the host avatar) may be formed around the avatar 311a after the avatar 311a approaches some specific virtual location designed for a group of avatars to collaboratively perform some particular activities, and/or some virtual objects (e.g., props) that can be collaboratively interacted by a group of avatars.

After the certain location 305 of the avatar 311a is defined, whenever an arbitrary avatar (called as a first avatar hereinafter) enters the certain location 305, the processor 104 may start to accumulate a first staying time of the first avatar (e.g., one of the avatars 311b-311d) staying in the certain location 305 and define the first staying time as the staying time mentioned in step S210. In other embodiments, the processor 104 may start the accumulate the staying time of a plurality of first avatars (e.g., the avatars 311b-311d) after a number of the first avatars in the certain location 305 are determined to be higher than an amount threshold, but the disclosure is not limited thereto.

In step S220, the processor 104 identifies the avatars 311a-311d as a specific group 311 if the staying time exceeds a time threshold. In various embodiments, the time threshold may be defined to be any time length (e.g., several minutes) that is long enough for the designer to consider the avatars 311a-311d are having meaningful interactions, instead of just meeting each other by chances or just passing by, but the disclosure is not limited thereto.

In one embodiment, the processor 104 may further monitor a plurality of interactive behaviors between the avatars 311a-311d after identifying the specific group. The interactive behaviors between the avatars 311a-311d may include a plurality of gestures, a plurality of texting contents, and a plurality of voice contents inputted by the users, and the processor 104 may find corresponding keywords corresponding to the interactive behaviors between the avatars 311a-311d. For example, if the interactive behaviors are recognized to be including several greeting expressions, such as users saying "hello", shaking hands, the processor 104 may retrieve keywords such as "hello" and "shaking hands", etc. For another example, if the interactive behaviors are recognized to be including several expressions related to happiness, such as users saying "haha", clapping hands, the processor 104 may retrieve keywords such as "haha" and "clapping hands," etc. For some other examples, if the interactive behaviors are recognized to be including several terminologies related to certain field (e.g., politics, technologies, or sports), such as users saying "smart phone", "4G communications", "white house", "the president", "NBA", "MLB" the processor 104 may retrieve keywords such as "smart phone", "4G communications", "white house", "the president", "NBA", "MLB", etc. Besides, if the interactive behaviors are recognized to be including several furious tones or even some cursing words, the processor 104 may retrieve the cursing words as the keywords as well.

Afterwards, in step S230, the processor 104 provides at least one of the users with a questionnaire.

In one embodiment where the processor 104 does not monitor the interactive behaviors between the avatars 311*a*-311*d*, the questionnaire provided by the processor 104 may simply include a bunch of predetermined candidate activities. In this case, the users corresponding to the avatars 311*a*-311*d* may choose the candidate activities that fit the currently performed activities in the specific group 311. The predetermined candidate activities may include, but not limited to: "Making people laugh", "Helping other people", "Learning new things", "Creating something new", "Making new friends", "Having a party", "Watching videos", "Taking a tour", "Questing", "Farming", "Dancing", "Attending an event", "Discussing tech", "Arguing about politics", etc.

In a first embodiment where the processor 104 monitors the interactive behaviors between the avatars 311*a*-311*d*, the processor 104 may identify one of the users as a leader user. For ease of the following discussions, the leader user may be assumed to be the user that possess the coordinating device 100, i.e., the user who controls the avatar 311*a* (i.e., the host avatar), but the disclosure is not limited thereto. In other embodiments, the processor 104 may identify other users as the leader user based on other criteria, such as the activity level presented by each of the users. For example, the processor 104 may identify the user who is the most active among the users of the avatars 311*a*-311*d* as the leader user.

In the present embodiment, the questionnaire may include a plurality of questions corresponding to a plurality of candidate activities that are possibly performed by the avatars 311*a*-311*d*. Therefore, after identifying the leader user (e.g., the user of the avatar 311*a*), the processor 104 may use the keywords retrieved from the interactive behaviors to find the candidate activities corresponding to the keywords among a plurality of predetermined activities.

In various embodiments, the predetermined activities may include, but not limited to: "Making people laugh", "Helping other people", "Learning new things", "Creating something new", "Making new friends", "Having a party", "Watching videos", "Taking a tour", "Questing", "Forming", "Dancing", "Attending an event", "Discussing tech", "Arguing about politics", etc. The members of the group may also be given the ability to choose their own self-identifying activity by entering in custom text via writing, speech recognition, or by use of a virtual keyboard. A system can also be constructed where groups choose identifying characteristics from non-textual identifiers, such as emoji, stickers, animated images, or other visual descriptors.

In one embodiment, if the keywords retrieved based on the interactive behaviors are found to be "hello" and "shaking hands", the processor 104 may recognize the activity performed by the avatars 311*a*-311*d* may be "Making new friends". In another embodiment, if the keywords retrieved based on the interactive behaviors are found to be "haha" and "clapping hands", the processor 104 may recognize the activity performed by the avatars 311*a*-311*d* may be "Making people laugh". In yet another embodiment, if the keywords retrieved based on the interactive behaviors are found to be "white house", "the president", "furious tones", the processor 104 may recognize the activity performed by the avatars 311*a*-311*d* may be "Arguing about politics". In some other embodiments, if the keywords retrieved based on the interactive behaviors are found to be "smart phone", "4G communications", the processor 104 may recognize the activity performed by the avatars 311*a*-311*d* may be "Discussing tech".

With the keywords retrieved based on the interactive behaviors, one or more of the candidate activities may be recognized as matching the keywords. Next, the processor 104 may construct the questionnaire based on the candidate activities, wherein the questionnaire may include questions used to ask the leader user about whether the current activities performed by the avatars 311*a*-311*d* are one or more of the candidate activities.

In various embodiments, the questionnaire may be presented to the leader user in many ways. Taking FIG. 3B as an example, the processor 104 may pops up a pedestal in the middle of the specific group 311 with a gem 320 with a flag 322 above it.

Figure 3A:
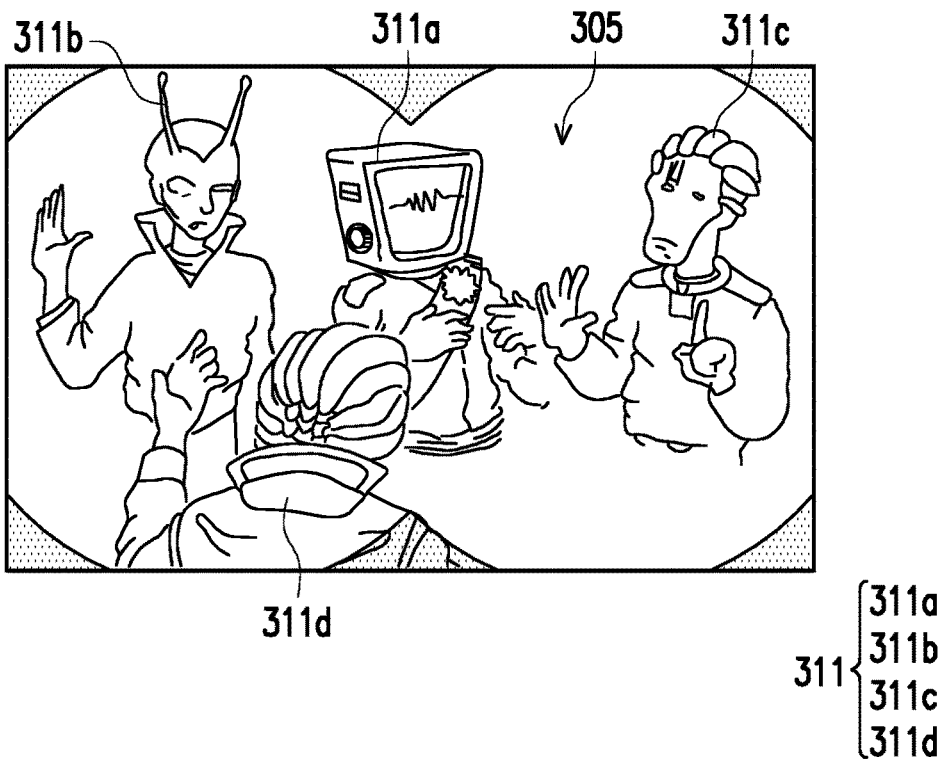
FIG. 3A to FIG. 3E are exemplary application scenarios illustrated based on FIG. 2.
Figure 3B:
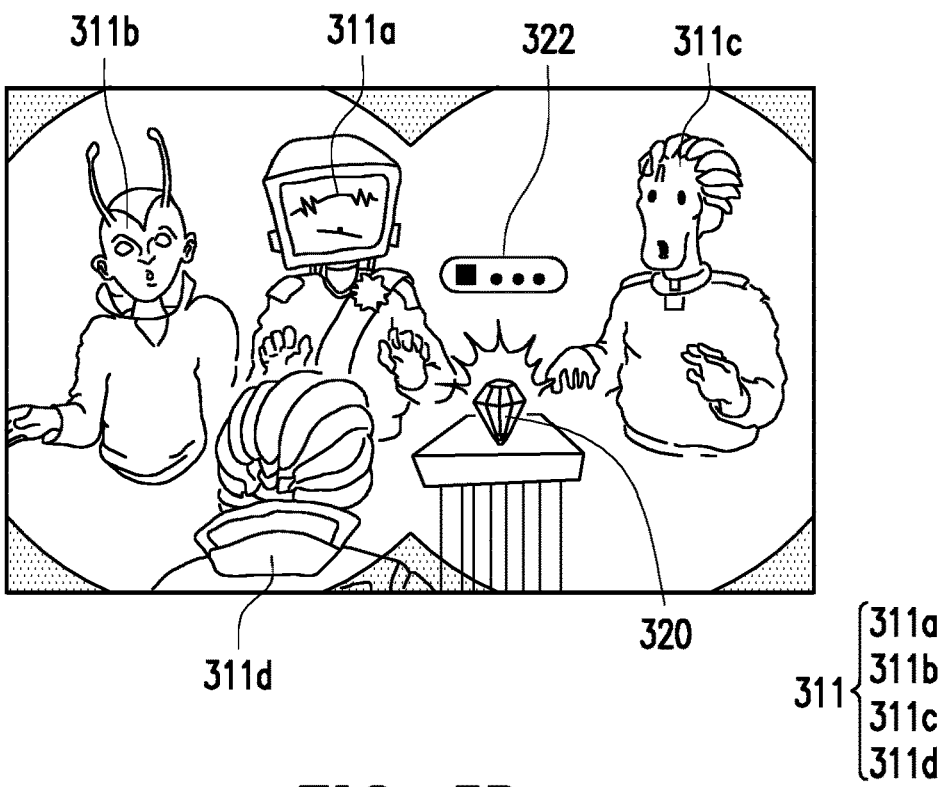
Figure 3C:
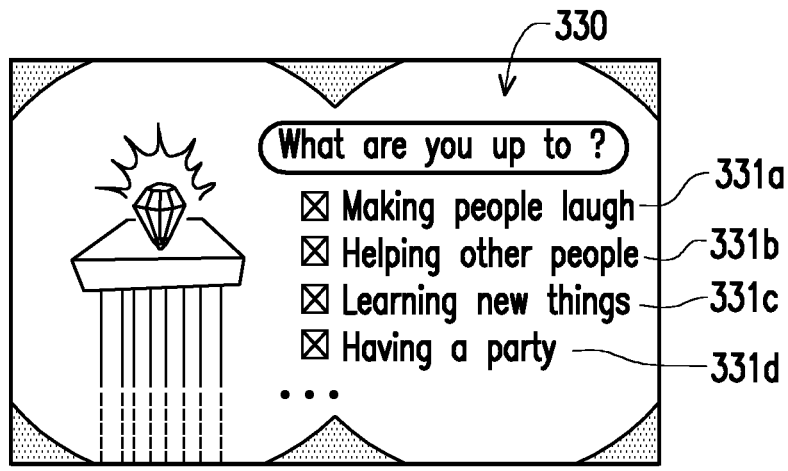

When the avatar 311*a* touches the flag 322, the processor 104 may provide the leader user with the view exemplarily shown in FIG. 3C. In FIG. 3C, the questionnaire may be implemented as a dialogue 330 including a plurality of candidate activities 331*a*, 331*b*, 331*c*, 331*d* (i.e., the activities possibly performed by the avatars 311*a*-311*d*) may be shown to the leader user to choose. The questionnaire may also be auditory via a spoken word dialog with the group. The questions could be issued by a computer controlled avatar or character that inhabits the same space as some or all of the group members.

Therefore, the leader user may choose one or more of the candidate activities as the current activities based on the actual activity that the avatars 311*a*-311*d* are currently performed.

Afterwards, in step S240, the processor 104 generate a group description about the specific group 311 formed by the avatars 311*a*-311*d* based on a plurality of answers of the at least one of the users on answering the questionnaire. For example, if the leader user chooses "Arguing about politics" as the answer of the questionnaire, the group description may describe the specific group as "Arguing about politics". For another example, if the leader user chooses "Making new friends" and "Having a party" as the answers of the questionnaire, the group description may describe the specific group as "Making new friends" and "Having a party", but the disclosure is not limited thereto.

Correspondingly, for an external avatar or user (who is not a member of the group), the status of the activities performed by the avatars 311*a*-311*d* may be easily recognized, such that the external avatar or user may accordingly decide whether to join/approach the specific group 311. Specifically, if the external avatar or user is interested in the activity (e.g., "Making new friends") of the avatars 311*a*-311*d*, the external avatar or user may hope to be a part of the activity. On the other hand, if the external avatar or user is not interested in the activity (e.g., "Arguing about politics") of the avatars 311*a*-311*d*, the external avatar or user may directly leave, and hence the external avatar or user won't feel uncomfortable about the contents of the activities of the avatars 311*a*-311*d*. In this way, the external avatar may understand the atmosphere/contents of the activities of the specific group 311 in advance, and hence misunderstandings, feeling of exclusion and/or missed opportunities for collective action may be avoided. Meanwhile, the users of the avatars 311a-311d will not be sabotaged by the external users having no idea about the activity therebetween. Therefore, the social experiences of the users in the VR environment or the online game environment may be improved.

In various embodiments, the group description may be shown to the external avatar or user in many ways. In one embodiment, the group description about the specific group 311 may be displayed around the avatars 311a-311d. For example, the processor 104 may use a floating banner to show the group description around the avatars 311a-311d. The floating banner may be constantly shown or be shown in response to the external avatar is detected to be spaced from the certain location 305 by less than a distance threshold. In other embodiments, the group description may also be shown in response to a query of the external avatar. For example, a flag may be shown around the avatars 311a-311d and be expanded to show the group description whenever the external avatar or user interacts (e.g., touches or vocally activates) with the flag, but the disclosure is not limited thereto. In another alternative, a user may select the group via various standard means and a resulting dialog box can show data about the group, including its self-identified characteristics.

Figure 3D:
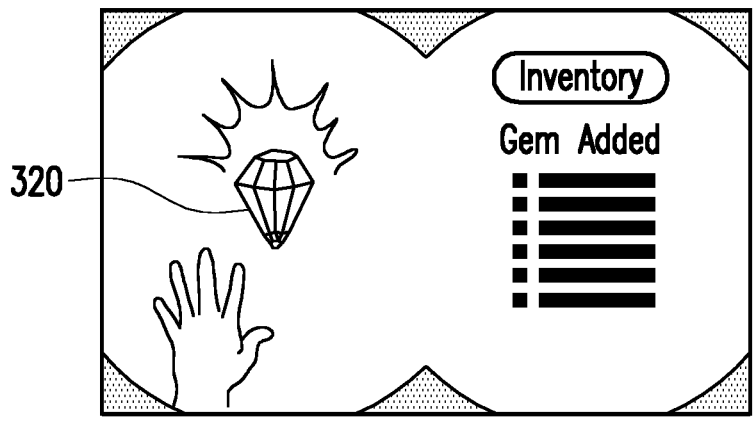

In the present embodiment, after the leader or group as a whole finishes the questionnaire, the processor 104 may give the avatar 311a the gem 320 as an incentive for answering the questionnaire, as shown in FIG. 3D, and the gem 320 may be added to the inventory of the avatar 311a, but the disclosure is not limited thereto. The nature of these incentives may be communicated to the group before the questionnaire is complete. In other embodiments, the incentives may also include, but not limited to, preferential access to high-demand social VR worlds, given that most social VR worlds can only host a limited number of participants, or increased reputation that is broadcasted to other users. Incentives could also include in-app currency. The actions of the group, in identifying its activities, can also serve to affect the digital reputation of the members of the group. If the group self-identifies and this leads to more positive behavior, the users' reputations can be adjusted in a positive way. If the group gives inaccurate self-labeling that leads to negative behavior, the system can record this and accordingly reduce the reputation of the members of the group.

Further, the processor 104 may add a tag on each of the avatars 311a-311d for showing that the avatars 311a-311d belong to the specific group 311 for as long as each member meets the criteria of belonging to the group. As exemplarily shown in FIG. 3E, tags 341a and 341b may be added to the avatars 311a and 311b, respectively, for showing that the avatars 311a and 311b are belonging to the same group (i.e., the specific group 311). From another perspective, the tags 341a and 341b may facilitate the external avatar or user to visually recognize that the avatars 311a and 311b belong to the same group, which lowers the difficulties of recognizing groups.

In the first embodiment discussed in the above, the processor 104 provides the leader user with the questionnaire for the leader user to choose and accordingly construct the group description based on the chosen candidate activities. In the following, a second embodiment where the questionnaire is provided to more users will be discussed.

Specifically, the questionnaire (e.g., the dialogue 330) including the candidate activities may be shown to each of the users of the avatars 311a-311d as the way shown in FIG. 3C, such that each of the user may choose one or more of the candidate activities as the current activities that they think may best fit the activities currently performed by the avatars 311a-311d.

Next, the processor 104 may find a predetermined number of mostly chosen activities among the one or more current activities, and accordingly construct the group description about the specific group 311 based on the mostly chosen activities. For example, if the candidate activities "Making people laugh" and "Helping other people" are the mostly chosen activities among the candidate activities, the processor 104 may construct the group description as describing the specific group 311 as "Making people laugh" and "Helping other people". Afterwards, the group description may be presented to the external avatar or user via the ways mentioned in the first embodiment, which would not be repeated herein. Over time, the system can learn from how groups identify themselves, especially when groups choose custom text. The system can start to form automatic association between the activities of the group and the description the group uses. These descriptions can then suggested to subsequent groups who are observed to be engaging in similar activities. Through this mechanism, the suggested activities become more relevant over time.

Figure 3E:
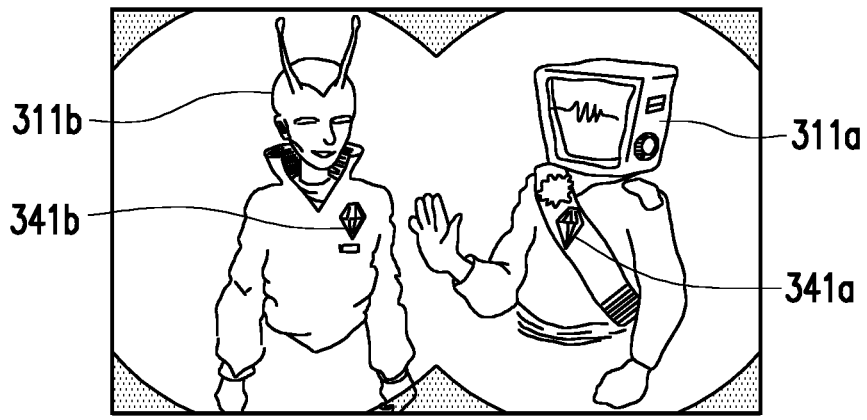

Similarly, for the users answering the questionnaire, the processor 104 may give the gem 320 as an incentive, as shown in FIG. 3D. Further, the avatars 311a-311d may be added with a tag that shows the avatars 311a-311d belong to the same group, as shown in FIG. 3E.

In addition, after the processor 104 generated the group description, the processor 104 may show the group description for the users to inform the users how the specific group 311 is identified to other users.

Therefore, in the second embodiment, the external avatar or user may decide whether to join/approach the specific group 311 based on the group description. Since the group description of the second embodiment are generated based on a plurality of the users' choices, the group description may better fit the actual activities currently performed by the avatars 311a-311d. In this way, the external avatar may understand the atmosphere/contents of the activities of the specific group 311 in advance, and hence misunderstandings, feeling of exclusion and/or missed opportunities for collective action may be avoided. Meanwhile, the users of the avatars 311a-311d will not be sabotaged by the external users having no idea about the activity therebetween. Therefore, the social experiences of the users in the VR environment or the online game environment may be improved.

Although the coordinating device 100 is assumed to be the device (e.g., a smart phone, a tablet, a personal computer) used by one of the users to control one of the avatars 311a-311d, in other embodiments, the coordinating device 100 may be implemented as the server that manages the VR environment or the online game environment. Under such circumstance, the coordinating device 100 may treat any desired avatar in the considered virtual environment (e.g., the VR environment or the online game environment) as the host avatar and perform the method of FIG. 2 based on the above teachings to generate a group description if the host avatar is determined to be forming a specific group with other adjacent avatars.

In some other embodiments, when the avatars 311a-311d cease interacting with each other, the specific group 311 and the associated group description and tags (e.g., the tags 341a and 341b) may be removed correspondingly.

The disclosure further provides a computer program product for executing foregoing method for identifying and describing a group. The computer program product is composed of a plurality of program instructions (for example, a setting program instruction and a deployment program instruction) embodied therein. These program instructions can be loaded into an electronic device and executed by the same to execute the method for identifying and describing a group and the functions of the electronic device described above.

In summary, the method for identifying and describing a group, the coordinating device, and the computer program product of the disclosure may identify a plurality of avatars as a specific group after the avatars are detected to be staying together for a while. Further, the interactive behaviors among the avatars in the same group may be monitored, and a questionnaire including several candidate activities may be generated based on the interactive behaviors for the users of the avatars to choose. With the chosen candidate activities, the group description may be generated for describing the activities currently performed by the avatars of the specific group. Therefore, for the external avatar or user, the atmosphere/contents of the activities of the specific group may be understood in advance, and hence misunderstandings, feeling of exclusion and/or missed opportunities for collective action may be avoided.

From another perspective, the disclosure may be regarded as providing an intermediary between informal groups of participants and users who want to participate in the same locale, in a harmonious way, with the existing group. The method of the disclosure seeks to make visitors to digital locales that are unfamiliar feel more comfortable and safe. The comfort comes from knowing that their chance of making social blunders is reduced. Safety is enhanced by conveying to other occupants of a space that a group's actions are being monitored by underlying mechanisms. Because the initial querying of a group for its intent occurs in a very light-weight manner, members of the ad-hoc group are less likely to have their involvement in the actual group activity compromised. This disclosure relies on the ability for the system to notice when multiple participants are forming an ad-hoc group, the construction of a simple but encompassing taxonomy of common intents and activities, and communication cues that are salient but not distracting.

When machine learning algorithms are fed by data from affective sensing (the ability to analyze various input streams to determine a user's emotional state), methods for tracking group activity can be used to create enforcement strategies. If a group deviates from its publicly declared intent, the group can first be informed and eventually censured.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for identifying and describing a group, comprising:
   accumulating a staying time of a plurality of avatars staying at a certain location, wherein the avatars are controlled by a plurality of users;
   identifying the avatars as a specific group if the staying time exceeds a time threshold;
   providing at least one of the users with a questionnaire; and
   generating a group description about the specific group formed by the avatars based on a plurality of answers of the at least one of the users on answering the questionnaire.

2. The method according to claim 1, wherein the avatars are in a virtual reality environment or an online game environment.

3. The method according to claim 1, wherein the avatars comprise a host avatar, and the step of accumulating the staying time of the plurality of avatars staying at the certain location comprises:
   defining a certain space around the host avatar as the certain location;
   if a first avatar enters the certain space, accumulating a first staying time of the first avatar staying in the certain space; and
   defining the staying time as the first staying time.

4. The method according to claim 1, further comprising monitoring a plurality of interactive behaviors between the avatars, and the step of providing the at least one of the users with a questionnaire comprises:
   providing the at least one of the users with the questionnaire based on the interactive behaviors.

5. The method according to claim 4, wherein the interactive behaviors comprise a plurality of gestures, a plurality of texting contents, and a plurality of voice contents inputted by the users, and the step of monitoring the plurality of interactive behaviors between the avatars if the staying time exceeds the time threshold comprises:
   analysing the interactive behaviors to find a plurality of keywords corresponded thereto.

6. The method according to claim 5, wherein the questionnaire comprises a plurality of questions corresponding to a plurality of candidate activities that are possibly performed by the avatars, and the step of providing the at least one of the users with the questionnaire based on the interactive behaviors comprises:
   identifying one of the users as a leader user;
   using the keywords retrieved from the interactive behaviors to find the candidate activities corresponding to the keywords among a plurality of predetermined activities;
   showing a dialogue comprising the candidate activities for the leader user to choose.

7. The method according to claim 6, wherein the step of generating the group description about the specific group formed by the avatars based on the plurality of answers of the at least one of the users on answering the questionnaire comprises:
   retrieving at least one current activity chosen by the leader user from the candidate activities in the dialogue;
   constructing the group description about the specific group based on the at least one current activity.

8. The method according to claim 5, wherein the questionnaire comprises a plurality of questions corresponding to a plurality of candidate activities that are possibly performed by the avatars, and the step of providing at least one of the users with the questionnaire based on the interactive behaviors comprises:
   using the keywords retrieved from the interactive behaviors to find the candidate activities among a plurality of predetermined activities;
   showing a dialogue comprising the candidate activities for each of the users to choose.

9. The method according to claim 8, wherein the step of generating the group description about the specific group formed by the avatars based on the plurality of answers of the at least one of the users on answering the questionnaire comprises:
retrieving at least one current activity chosen by each of the users from the candidate activities in the dialogue;
finding a predetermined number of mostly chosen activities among the at least one current activity;
constructing the group description about the specific group based on the mostly chosen activities.

10. The method according to claim 1, further comprising: adding a tag on each of the avatars for showing that the avatars belong to the specific group.

11. The method according to claim 1, further comprising: assigning an incentive for the users who answered the questionnaire.

12. The method according to claim 1, wherein after the step of generating the group description, further comprising: displaying the group description about the specific group around the avatars.

13. The method according to claim 12, wherein the step of displaying the group description about the specific group around the avatars comprises:
showing the group description in response to a query of an external avatar of the specific group.

14. The method according to claim 12, wherein the step of displaying the group description about the specific group around the avatars comprises:
using a floating banner to show the group description in response to an external avatar is detected to be spaced from the certain location by less than a distance threshold.

15. A coordinating device, comprising:
a non-transitory storage circuit, storing a plurality of modules; and
a processor, coupled with the non-transitory storage circuit and executing the modules to perform following steps:
accumulating a staying time of a plurality of avatars staying at a certain location, wherein the avatars are controlled by a plurality of users;
identifying the avatars as a specific group if the staying time exceeds a time threshold;
providing at least one of the users with a questionnaire; and
generating a group description about the specific group formed by the avatars based on a plurality of answers of the at least one of the users on answering the questionnaire.

16. The coordinating device according to claim 15, wherein the avatars are in a virtual reality environment or an online game environment, and the coordinating device is a server managing the virtual reality environment or the online game environment.

17. The coordinating device according to claim 15, wherein the avatars comprise a host avatar, and the processor is configured to:
define a certain space around the host avatar as the certain location;
if a first avatar enters the certain space, accumulate a first staying time of the first avatar staying in the certain space; and
defining the staying time as the first staying time.

18. The coordinating device according to claim 17, wherein the host avatar is controlled by the coordinating device.

19. The coordinating device according to claim 15, wherein the processor is further configured to monitor a plurality of interactive behaviors between the avatars and provide the at least one of the users with the questionnaire based on the interactive behaviors.

20. The coordinating device according to claim 15, wherein the interactive behaviors comprise a plurality of gesturers, a plurality of texting contents, and a plurality of voice contents inputted by the users, and the processor is configured to:
analyse the interactive behaviors to find a plurality of keywords corresponded thereto.

21. The coordinating device according to claim 20, wherein the questionnaire comprises a plurality of questions corresponding to a plurality of candidate activities that are possibly performed by the avatars, and the processor is configured to:
identify one of the users as a leader user;
use the keywords retrieved from the interactive behaviors to find the candidate activities corresponding to the keywords among a plurality of predetermined activities;
show a dialogue comprising the candidate activities for the leader user to choose.

22. The coordinating device according to claim 21, wherein the processor is configured to:
retrieve at least one current activity chosen by the leader user from the candidate activities in the dialogue;
construct the group description about the specific group based on the at least one current activity.

23. The coordinating device according to claim 20, wherein the questionnaire comprises a plurality of questions corresponding to a plurality of candidate activities that are possibly performed by the avatars, and the processor is configured to:
use the keywords retrieved from the interactive behaviors to find the candidate activities among a plurality of predetermined activities;
show a dialogue comprising the candidate activities for each of the users to choose.

24. The coordinating device according to claim 23, wherein the processor is configured to:
retrieve at least one current activity chosen by each of the users from the candidate activities in the dialogue;
find a predetermined number of mostly chosen activities among the at least one current activity;
construct the group description about the specific group based on the mostly chosen activities.

25. The coordinating device according to claim 15, wherein the processor is further configured to:
add a tag on each of the avatars for showing that the avatars belong to the specific group.

26. The coordinating device according to claim 15, wherein the processor is further configured to:
assigning an incentive for the users who answered the questionnaire.

27. The coordinating device according to claim 15, wherein the processor is further configured to:
displaying the group description about the specific group around the avatars.

28. The coordinating device according to claim 27, wherein the processor is configured to:
showing the group description in response to a query of an external avatar of the specific group.

29. The coordinating device according to claim 27, wherein the step of displaying the group description about the specific group around the avatars comprises:

using a floating banner to show the group description in response to an external avatar is detected to be spaced from the certain location by less than a distance threshold.

30. A non-transitory computer program product for use in conjunction with a coordinating device, the non-transitory computer program product comprising a computer readable storage medium and an executable computer program mechanism embedded therein, the executable computer program mechanism comprising instructions for:

accumulating a staying time of a plurality of avatars staying at a certain location, wherein the avatars are controlled by a plurality of users;

identifying the avatars as a specific group if the staying time exceeds a time threshold;

providing at least one of the users with a questionnaire; and generating a group description about the specific group formed by the avatars based on a plurality of answers of the at least one of the users on answering the questionnaire.

* * * * *